Oct. 10, 1961　　　R. K. BAILEY　　　3,003,464
FEED CONVEYOR

Filed Aug. 4, 1958　　　　　　　　　　　　7 Sheets-Sheet 7

INVENTOR.
RALPH K. BAILEY
BY
Marechal, Biebel, French & Bugg
ATTORNEYS

United States Patent Office 3,003,464
Patented Oct. 10, 1961

3,003,464
FEED CONVEYOR
Ralph K. Bailey, Springfield, Ohio, assignor, by mesne assignments, to The Buckeye Incubator Company, Springfield, Ohio, a corporation of Delaware
Filed Aug. 4, 1958, Ser. No. 752,689
6 Claims. (Cl. 119—52)

This invention relates to a feed conveyor for poultry wherein feed is distributed throughout a feeder course which may include portions at various vertical levels.

In the present invention the feeder course is laid out to provide maximum accessibility of feed to poultry and with this object in mind the feeder course may take the form of several interconnected feeder runs some of which are in parallel relation and others of which meet in corners, or may be arranged in one or more curved paths. These feeder runs may also be spaced vertically apart to provide a feeding arrangement suitable for chickens which are kept in cages rather than in flocks.

It is a principal object of the present invention to provide a flexible endless feed distributor which can be moved longitudinally through a feeder course of the kind described, to convey feed material from a feed storage and throughout said feeder course. It is important that such a feed distributor be flexible so that it can be threaded through the variously arranged feeder courses and can follow the numerous turns and inclinations followed by the feeder course.

A feed distributor in the form of a coil spring member which is moved longitudinally through the feeder course has been found to meet the foregoing requirements. The flexible coil spring can be bent anywhere along its length so it can conform to any desired configuration as it is propelled longitudinally around the feeder course.

It is a further object of the invention to provide a coil spring feed distributor having the coils thereof sufficiently spaced apart to receive feed material therein for conveyance throughout the feeder course. It is further intended to provide a feeder course construction in combination with the coil spring distributor which will allow the coil spring distributor to lift feed material therein vertically as well as propelling it longitudinally in various horizontal directions.

Another object of the invention is to provide suitable drive mechanisms in conjunction with a coil spring feed distributor which are capable of propelling the coil spring lengthwise together with the feed material contained therein. These drive mechanisms make suitable provision for the flexible nature of the feed distributor so that the propelling force is imparted to the coil spring distributor without the coil spring bending away from the drive mechanisms. The drive mechanisms may take the form of sprocket drive wheels, or dowel pins. Whichever of the specific driving mechanisms is used, it is intended that the feed distributor be movable at a controlled rate to deliver the precise quantity of feed material throughout the feeder course which will satisfy poultry feeding requirements.

In addition to the foregoing objects it is intended that the feed distributor system be economical to maintain and construct and will deliver the feed material in a sanitary condition.

Other objects and advantages of the invention will be apparent from the following description, the accompanying drawings and the appended claims.

Figure 1:
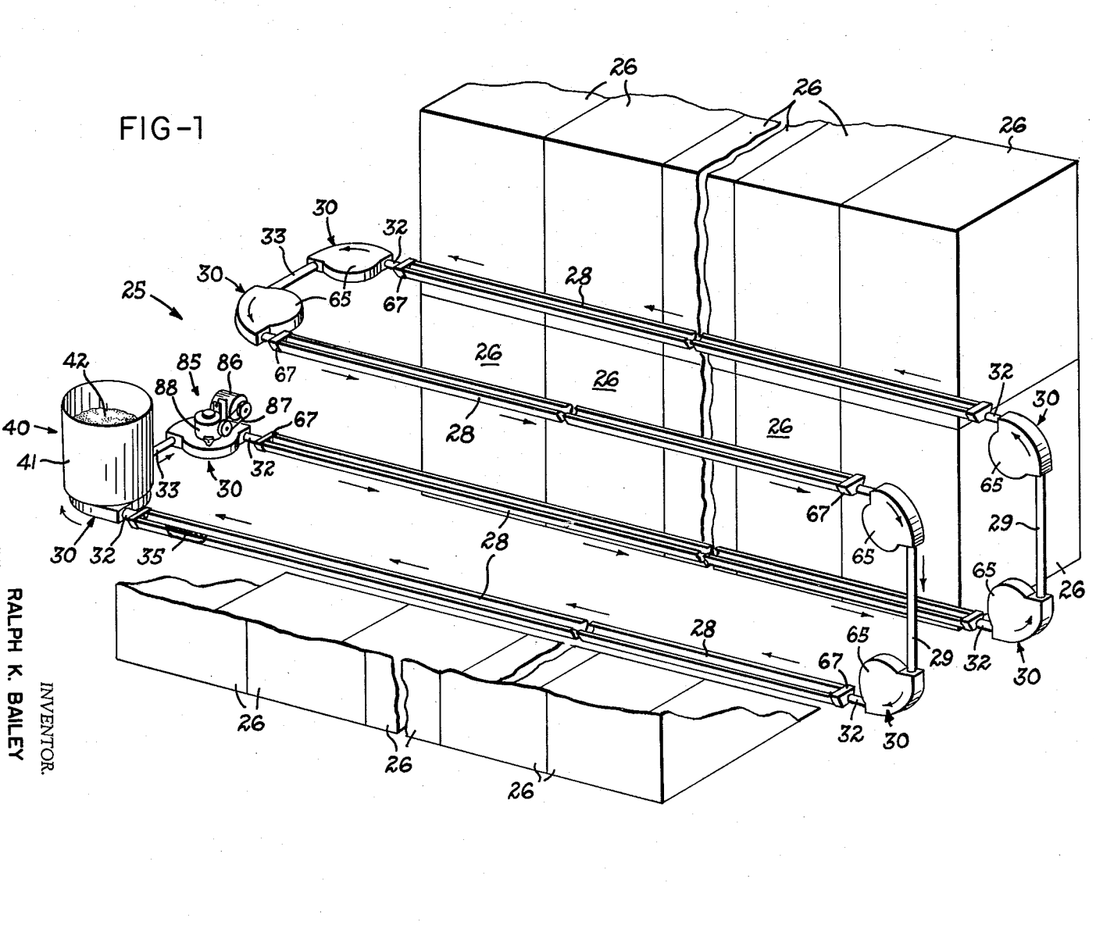
FIG. 1 shows in perspective view a multiple-deck single-aisle feeder system suitable for distributing feed to poultry in cages.
Figure 2:
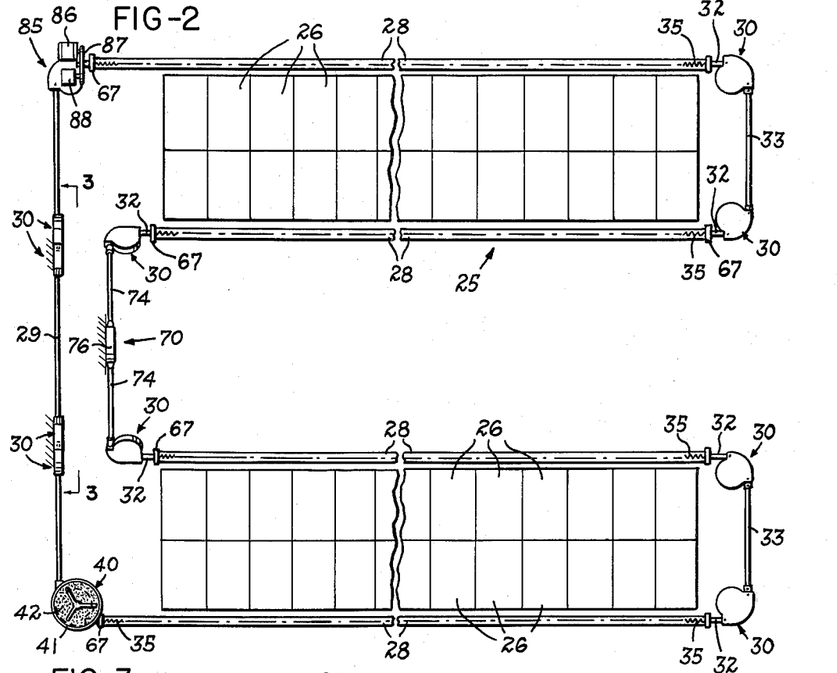
FIG. 2 is a plan view of a single-deck multiple-aisle arrangement of back-to-back cages which constitutes a further suitable arrangement for distributing feed to poultry in cages.
Figure 3:
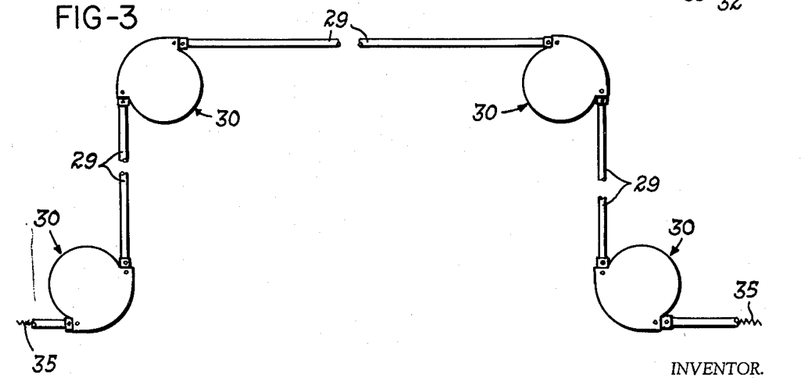
FIG. 3 is a view of a portion of the feeder course in FIG. 2 looking in the direction of the reference arrows 3—3 and showing the portion of the feeder course extending vertically to provide access to the aisles between adjacent rows of cages.
Figure 4:
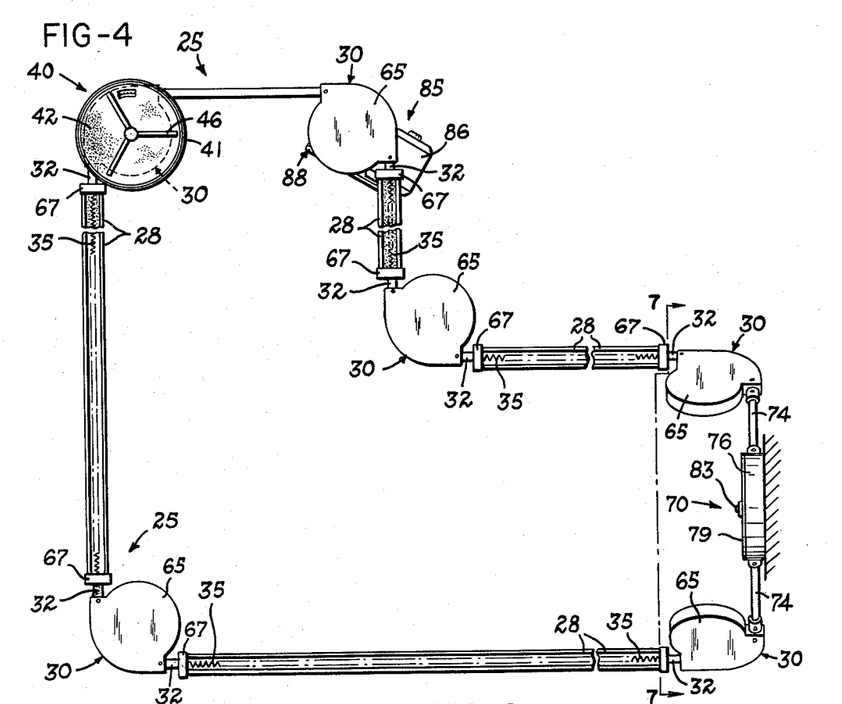
FIG. 4 is a top view of a feeder system suitable for distributing feed to poultry in flocks, there being a vertically inclined portion of the feeder system at the right hand side of the figure which represents an "aisle crossing" device.

Referring to FIGS. 1, 2 and 3, the feeder system, designated generally by reference numeral 25, is adaptable for multiple level feeding wherein the poultry are kept separated in individual cages 26 or, the system is equally usable for feeding poultry which are maintained in flocks (FIG. 4).

There is a growing recognition of the advantages of caged poultry systems versus flock maintenance. A recent publication titled "Keeping Chickens in Cages" (4th ed.) 1956, by Hartman and King sets forth the comparative advantages and numerous instructions for the husbandry of caging poultry.

In the cage type feeder system there are a number of open feeder troughs 28 which extend past rows of cages 26 each having a chicken isolated therein. The cages can be arranged into various combinations of aisles and decks depending upon the poultryman's facilities. The arrangement of FIG. 1 is a single aisle multiple deck feed course. The feeder troughs 28 are sufficiently close to the cages to allow the chicken access to the feed contained therein. The horizontal troughs 28 are connected by vertical closed conduits 29 which pass the feed upwardly from one level to the next and thence down again as the arrows indicate in order to distribute feed throughout all of the troughs 28. The entire system of interconnected feeder troughs 28 and conduits 29 is known as the feeder course.

Referring to FIG. 2, the cages 26 can also be arranged in back-to-back relation, with a number of these back-to-back cages formed in rows having aisles therebetween. The feeder troughs 28, as in FIG. 1, are sufficiently close to the cages to allow the chickens access to the feed.

In the cage feeder arrangement of FIGS. 1 and 2, wherever the direction of feed distribution changes there is a cornering device 30 to guide the new direction of movement. The cornering devices 30 are each fully enclosed to prevent loss of feed material which is transmitted therethrough without spillage. Within each cornering device is an idler wheel which is free to rotate in the cornering device 30. Between each cornering device and adjacent trough end is a conduit stub which guides movement of the coil spring feed distributor 35 as it moves through the cornering device 30. Where the direction of feed movement is between cornering devices 30, a short length 33 of conduit is provided for this purpose. By appropriately selecting lengths of conduits 29, 33 and troughs 28, a feeder course can be provided for whatever arrangement of caged poultry is most advantageous viz., single or double deck, single or multiple aisles etc.

Figure 20:
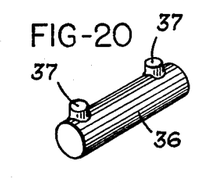
FIG. 20 shows the connecting member and spring ends in assembled relation.
Figure 21:
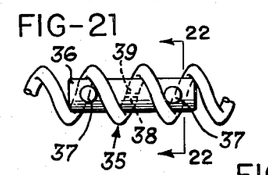
FIG. 21 is a sectional view taken on line 21—21 of FIG. 20.
Figure 22:
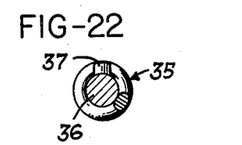
FIG. 22 is a detail view of the connection between a cornering device and an adjacent feeder trough.

To obtain movement of feed material through the various components of the feeder course there is provided a length of coil spring 35 threaded through the entire feeder course and joined at the ends thereof by a pin 36 (FIG. 20) having radially projecting bosses 37 thereon which are wound into the helical coils of the spring. This coil spring thus forms a closed loop feed conveyor which is movable longitudinally through the feeder course with the coils of the spring being spaced to collect feed material for transfer along the feeder course as the spring moves therethrough.

Figures 5, 6:
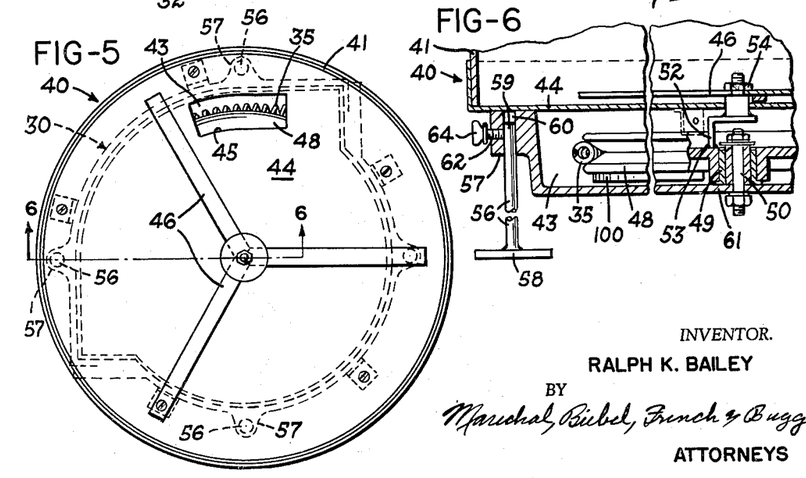
FIG. 5 is an enlarged top view of the feed hopper shown in FIGS. 1, 2 and 4.
FIG. 6 is an enlarged sectional view of the hopper taken on line 6—6 of FIG. 5.

The feeder system 25 includes a feed hopper 40 from which granular feed is dispensed for conveyance through the feeder circuit. Referring particularly to FIGS. 1, 5 and 6, the feed hopper 40 comprises a cylindrical bin 41 containing a quantity of feed 42 and a feed dispensing chamber 43 of arcuate channel shape separated from the interior of the bin 41 by the bottom 44 of the bin. An arcuate slot 45 in the bottom 44 allows feed 42 to discharge from the bin 41 into chamber 43, and a rotatable agitator 46 keeps the mass of feed 42 in motion tending to carry it into the region of the slot 45 where it feeds by gravity into the chamber 43.

Within the chamber 43 is a pulley 48 (FIG. 6), a sleeve 49 and an axle 50 which mounts the pulley wheel 48 for rotation thereon. A crank 52 which is welded at 53 to the pulley has a threaded end connected by nut 54 to the agitator 46. Rotation of the pulley 48 serves also to rotate the agitator 46.

The feed hopper 40 is held vertically by support legs 56 each having a base 58 and an end 59 extending through openings 60 in bosses 57 of casing 61. Each of the cornering devices 30 may be provided with the same or similar support structure to hold the feeder course above floor level. A set screw 62 (FIG. 8) with wing head 64 is then used to clamp the casing 61 at the proper vertical level and all of the structure supported thereon.

Figure 23:
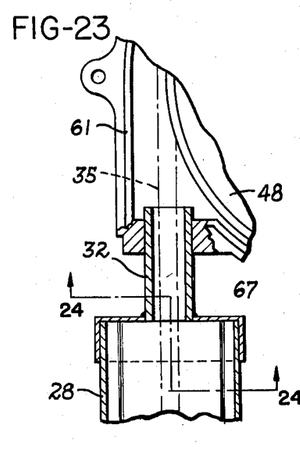
FIG. 23 is a sectional view taken on the line 23—23 of FIG. 22.
Figure 24:
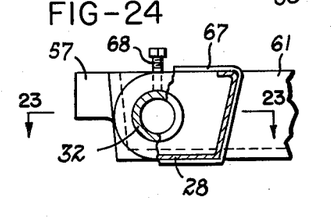

As shown in FIG. 6 the coil spring feed distributor 35 passes through chamber 43 of the feed dispenser hopper 40 and around the pulley 48. As the distributor 35 moves through the chamber 43 a certain amount of feed material 42 which has filled the chamber is collected between the coils thereof and is withdrawn. The feed 42 in chamber 43 is replenished from the bin 41, the feed simply moving downwardly to replace any of the withdrawn feed material 42.

Where the spring feed distributor 35 enters or leaves a cornering device 30, there is connected to the conduit stub 32 a telescoping section 67 (FIG. 23) which fits over the adjacent end of the trough 28. Each cornering device 30 has a cover 65 which encloses the one side of the cornering device to prevent feed material from spilling as it builds up therein. The stub conduit 32 guides the spring distributor so that it fits within the groove of the pulley 48 of the cornering device 30 and the conduit stub 32 is clamped in place by a bolt 68 (FIG. 24) which is threaded through the casing 61 and acts as a set screw holding the stub conduit 32 in position.

The cornering devices 30 can be turned at various angles so that the feeder course can move at right angles or be reversed by using two successive cornering devices as shown in FIGS. 1, 2 and 4. Also the cornering device 30 can be stood on edge (FIGS. 1, 2 and 3) to pass the feeder course vertically upwardly. A third alternative is to cant the cornering devices 30 to the positions shown in FIGS. 2, 4 so that the feeder course forms an "aisle-crosser" designated generally by reference numeral 70 in FIGS. 2, 4 and 7.

In FIG. 2, in order to facilitate entrance into the feeder course 25 there are provided two elevated portions of the feeder course. Referring to FIG. 3, which shows an elevated part of the feeder course at the outer periphery thereof, the cornering devices 30 are tipped on edge to provide vertically inclined conduit sections 29 which pass the feeder course straight up to the preferred vertical level. At the preferred height, two additional cornering devices 30 are connected by a horizontal section of conduit 29, thus forming a portal which allows a cart to move through the portal and into the feeder course 25 to gather eggs which are collected at same suitable part of the individual cages 26.

Figure 7:
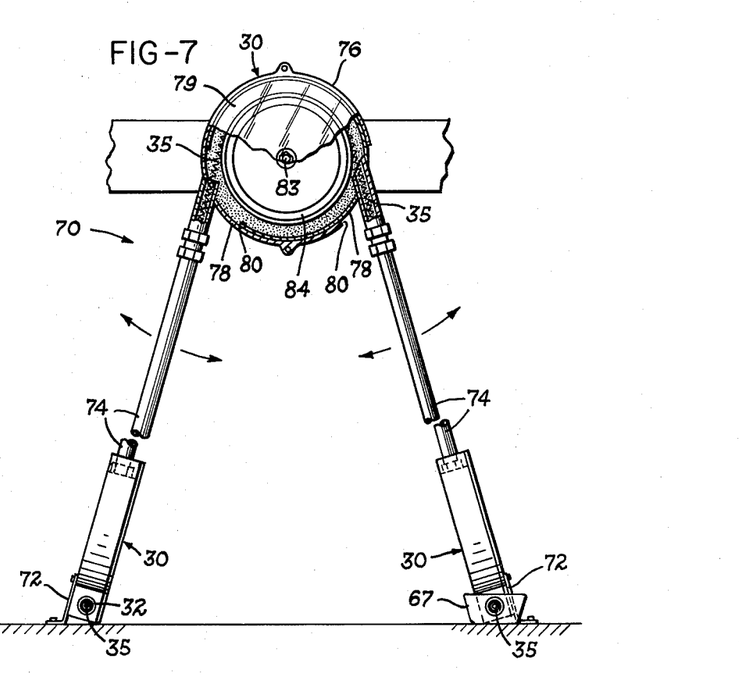
FIG. 7 is a detail view of the "aisle-crosser" looking in the direction of the arrows 7—7 in FIG. 4.

There is further included in the feeder course of FIG. 2 an aisle crosser 70 which is shown in detail in FIG. 7, the aisle crosser permitting the cart to move down the aisle between the two rows of cages. Where more than two rows of cages are desired, there may be provided an aisle crosser 70 between each adjacent row.

The aisle-crosser 70 comprises two cornering devices 30 which are vertically inclined at an acute angle with respect to the floor and are held in this position by brackets 72. Two closed conduits 74 connect at their lower ends with the cornering devices 30 and the conduits 74 meet at their upper ends in a drum shaped casing 76 having slidably interfitted sections 78. The sections 78 are incomplete circular members having gaps 80 each covered by the other section to confine the feed material therein while at the same time allowing the conduits 74 to move angularly as shown in FIG. 7. The conduits 74 being adjustable angularly, can provide an aisle-crosser 70 of the desired cross section. The ends of the conduits 74 connect with sections 78 and pass within the casing 76. The casing 76 is enclosed by cover plates 79 at the front and back thereof so that the casing can become filled with feed material 42. The casing 76 is supported at the desired vertical level by a pin 83 which may be set in the wall or other supporting structure and also serves as the mounting shaft for a freely rotatable pulley wheel 84 in the casing 76.

The spring distributor 35 moves first in a vertically upward direction through the one conduit 74 carrying feed material which gradually builds up in the conduit 74 and eventually fills the same. Once the feed material sufficiently fills the conduit 74 and casing 76 the movement of coil spring distributor can convey feed downwardly through the adjoining conduit 74. The movement of the coil spring distributor 35 will therefore transfer the feed material 42 from one side of the aisle to the other.

Figure 8:
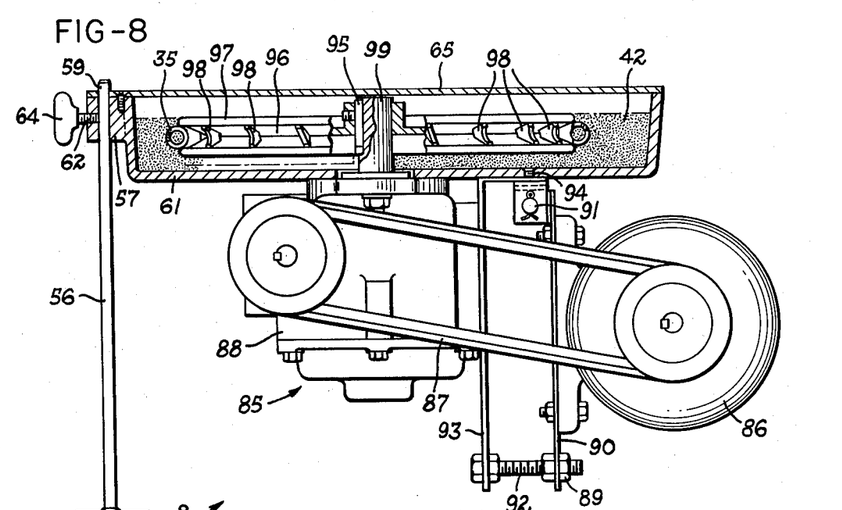
FIG. 8 is a sectional view taken on line 8—8 of FIG. 9 and showing the drive mechanism for the feed distributor.
Figure 9:
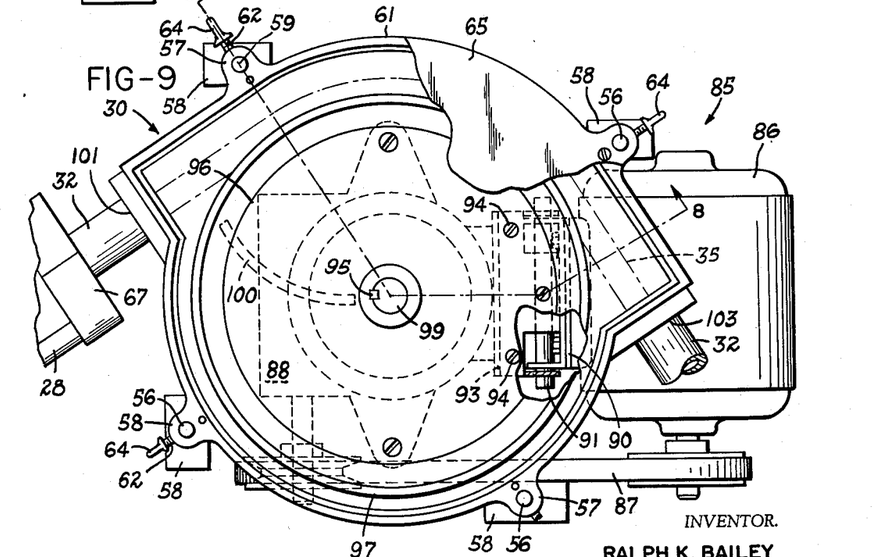
FIG. 9 is a top view of the drive mechanism shown with the cover plate thereof broken away.

The coil spring distributor 35 is propelled longitudinally through the feeder circuit by a driving mechanism designated generally by numeral 45 in FIGS. 8 and 9 and is powered by a motor 86 having a belt drive 87 connecting with gear reduction box 88 which reduces the rotary speed of the motor to a much lower level output.

The motor 86 is supported on a bracket 90 (FIG. 8) which is pivotally mounted on pin 91. The bracket is swung angularly on the pin to obtain the desired tensioning of belt 87 and thereafter held in this position by a threaded bolt 92 having nuts 89 which clamp the bracket 90 in the selected position. The bolt 92 is fastened to a plate 93 which is held to the base of the casing 61 by screws 94 having tapered heads fitting into recesses in the bottom of the casing 61 so as to avoid interference.

Figure 10:
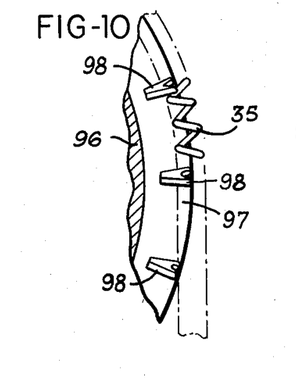
FIGS. 10 11, 12 and 13 are detail views of the driving teeth spaced around the circumference of the drive wheel shown in FIG. 8, these teeth being engageable with the coils of the feed distributor.
Figure 11:
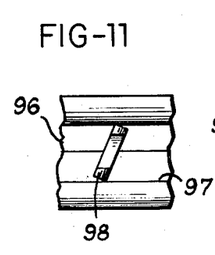

At the output end of the gear reduction box 88 is a drive shaft 99 having a keyed connection 95 with a drive wheel 96. The periphery 97 of drive wheel 96 is recessed and a number of circumferentially spaced teeth 98 are held with the recessed periphery 97 and are slightly inclined as shown in FIGS. 8, 10 and 11, in accordance wtih the pitch angle of the coils on the distributor spring 35.

Figure 12:
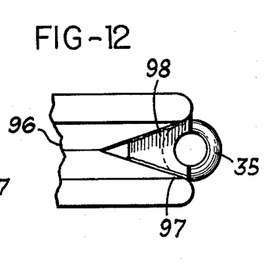
Figure 13:
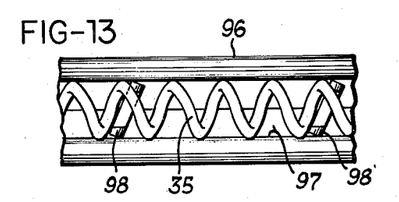

The coil spring distributor 35 is tensioned by stretching of the spring along its length so that it bears forcibly against the wheel 96 and rides within the recessed periphery 97. As the drive wheel 96 turns, the teeth 98 engage spaced coils of the spring and impart a longitudinal driving force to the spring 35 which is propelled forwardly by rotation of the wheel 96. The teeth 98 have considerable bearing contact with the coils since the coils fit within recess 97 (FIG. 12) and the inclination of the teeth 98 ensures simultaneous contact with at least two of the spring coils (FIG. 13) along the length of the spring. Tension of the spring distributor 35 prevents it from snapping away from the engaging teeth as the power wheel 96 turns.

In operation the casing 61 of the driving mechanism 85 (FIG. 8) fills with feed material to the level indicated. To ensure that feed is transferred through the casing 61, a finger 100 (FIG. 9) is attached to the bottom of the power wheel 96 to scoop the feed material from the inlet 101 opening toward the discharge opening 103.

Figure 14:
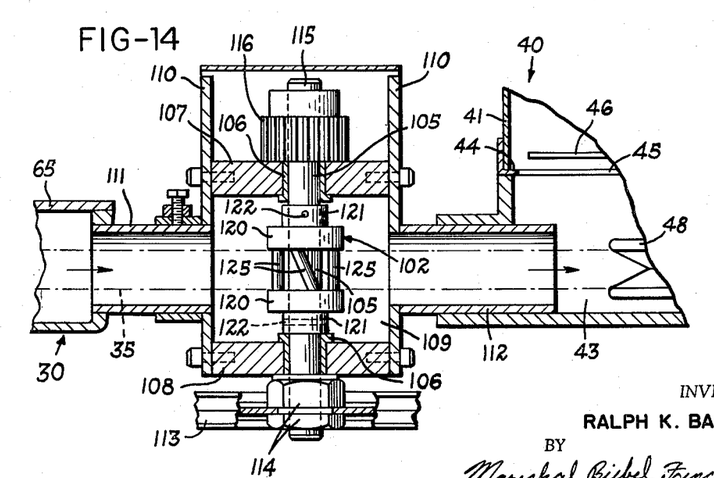
FIG. 14 is a sectional view taken through the conduit and feeder chamber having a second embodiment drive mechanism.
Figures 15, 16:
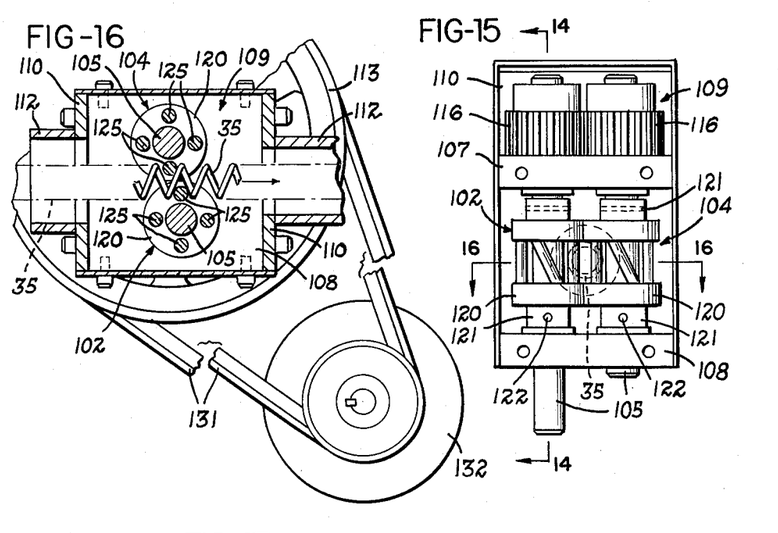
FIG. 15 is an end view of the second drive mechanism embodiment viewed from the right hand side of FIG. 14.
FIG. 16 is a sectional view taken on line 16—16 of FIG. 15.

A second driving mechanism which is also suitable for propelling the spring distributor is shown in FIGS. 14, 15 and 16. In this embodiment, rotatable driving devices 102, 104 are spaced one on each side of the coil spring distributor 35. The device 102 is mounted on a shaft 105 journaled at the ends thereof in bearing sleeves 106 which are received in walls 107 and 108 of chamber 109. The chamber 109 is enclosed by walls 110. The two end walls 110 (FIG. 14) have openings which connect with conduit sections 111, 112 leading from cornering device 30 and into the feed chamber 43.

The shaft 105 of drive device 102 is threaded at one end and receives a drive pulley 113 which is fastened thereto by nuts 114 at opposite sides thereof. At end 115 of the shaft 105 there is fastened a spur gear 116 which meshes with a second spur gear 117 on the shaft 105 of driving device 104. The two driving devices are therefore turned synchronously together but in opposite directions off the drive pulley 113.

Each of the driving devices 102 and 104 includes a pair of wheels 120 secured in spaced relation on the associate shaft 105 by hubs 121 and set screws 122. A number of spaced dowels 125 are located at their opposite ends in oversized openings 128 formed in the spaced wheels 120. Once the dowels are fitted in the openings 128 the bosses 120 are oppositely turned so that the ends of the dowel pins are tipped in the openings 128. The inclined position of the dowel pins corresponds substantially with the pitch of the spring so that as the dowel pins 125 engage the spring coils they take maximum bearing thereon.

The devices 102, 104 are oppositely rotatable and spaced one on each side of the distributor spring 35, as the dowel pins 125 are oppositely inclined in order that they both have full driving contact with the spring coils.

The driving elements 102, 104 are spaced approximately opposite each other so that the coil spring distributor 35 will not snap away from the driving elements 102, 104 as impelling force is exerted thereon. Also, the driving elements 102, 104 are offset one ahead of the other along the length of the spring distributor 35 (FIG. 16) and the dowel pins 125 are in such relative spacing that at least one of the dowel pins 125 is always in engagement with the coil spring distributor 35. The result is a steady even movement of the coil spring distributor 35.

The chamber 109 generally fills with feed material and it continues to build up until the rate of withdrawal by the spring distributor 35 equalizes the incoming feed material carried by the coil spring distributor 35. Filling of the chamber 109 with feed material however does not interfere with operation of the driving devices 102, 104. Referring to FIGS. 15, 16 the belt 131 drives pulley 113 through a motor 132, the pulley 113 serving to turn the shaft 105 as described previously.

In the operation of the feeder arrangements, FIGS. 1, 2 and 4, the bin 41 of the feed dispenser 40 is filled with a quantity of granular feed material appropriate to the diet of the poultry. The apparatus is then started to run either continuously or intermittently by operation of a timer (not shown). The feed material in the bin 41 drops through the slot 45 into the chamber 43, building up in amount until it begins to be withdrawn at the same rate as the inflow of feed material.

The coil spring distributor 35, which moves endlessly in a closed loop throughout the feeder circuit 25, collects the feed material between the coils and advances it from the chamber 43 through the closed conduits 32 and 33, cornering devices 30 into the troughs 28. When the feed material within the coil spring distributor 35 reaches the troughs 28 it becomes separated from the distributor 35 to fill the trough 28. The movement of the coil spring along its length pushes the feed material along the length of the trough 28 distributing it substantially evenly throughout the length thereof. At the end of each trough is a cornering device 30 which receives the coil spring distributor and changes the direction of movement thereof. The cornering device becomes filled with feed material but without impeding the movement of the distributor 35 or the feed material carried therewith. The apparatus continues to run until all of the troughs 28 are filled to the desired level, sufficient for the needs of the poultry. Generally, before the troughs at a higher vertical level can be filled (FIG. 2) the conduits 29 must become filled in order that movement of the coil spring distributor 35 can carry feed vertically upwardly. This applies also to the aisle crosser 70 (FIGS. 2, 4 and 7).

During operation of the feeder apparatus the motor 86 (FIG. 8) drives the power wheel 96 which catches the coils of the spring by the spaced teeth 98, causing the coil spring to move endlessly in its closed loop about the feeder course 25. The feed material 42 in the dispensing and storage device 40 must be eventually replenished since after a period of time all of the feed in the bin 41 will be transferred by the coil spring distributor 35 to the troughs 28 where it is consumed by the poultry.

In operation, the coil spring distributor 35 moves at a speed approximately 45 feet per minute. While the construction of the spring can vary considerably, a satisfactory spring size may be $11/16$ inch outer diameter coil, $1/2$ inch pitch and 8 gauge cross section. There are no practical limits on the shape or outline of the feeder course, it can extend variously both through vertical and horizontal planes. It has been found, however, that a feeder course length of 640 feet is the most suitable but this also can be varied to suit requirements. The greater the number of cornering devices which change direction of the feeder course 25, the shorter must be the overall length of the feeder course. Thus, the cage feeder arrangement shown in FIGS. 1 and 2 which generally has a considerable number of cornering devices must be of a shorter course length than the flock feeder arrangement of FIG. 4. In calculating the course length, it has been found that each cornering device which creates a corner of the feeder course is the approximate equivalent of 10 feet of a straight feeder course length.

Figure 17:
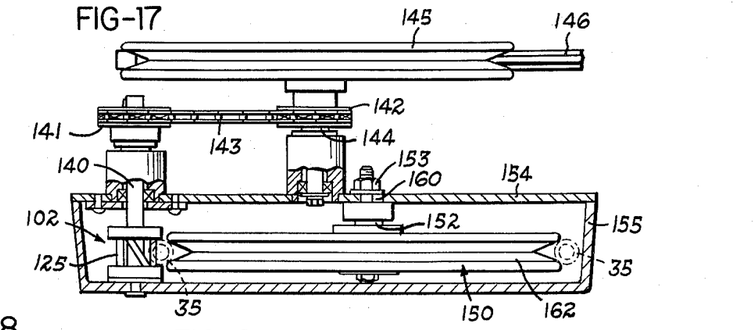
FIGS. 17 and 18 are detail sectional views showing the method of assembling the dowel pins in the latter two embodiments of the drive mechanism.
Figure 18:
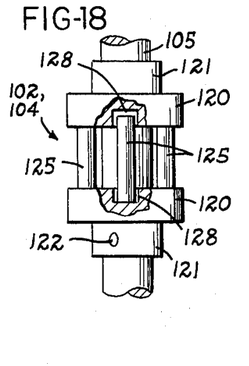
Figure 19:
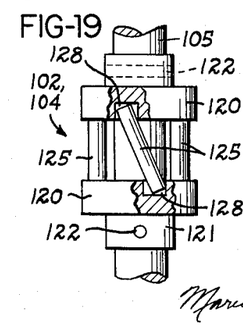
FIG. 19 is an isometric view of the connecting member joining the ends of the coil spring feed distributor to form an endless closed loop thereof.

With a course length of 640 feet to 1000 feet, a ⅓ horsepower motor is usable. The coil spring distributor is generally provided in lengths of 100 feet and the total finished length is obtained by joining together ends of these sections with a pin 36 of the construction shown in FIGS. 17, 18 and 19. When the coil spring distributor 35 is installed in the feeder course it is tensioned by approximately 1% of the length thereof to obtain the necessary tensile force which holds it against the drive wheel, and cornering devices.

Since the coil spring distributor 35 is flexible it can be strung through any feeder course 25 which is most appropriate to the plant layout available. Moreover, the feed distributing system is adaptable to whatever feeder arrangement is selected, viz. flock type feeding or cage type feeding. The coil spring distributor 35 is an economical construction and it has sufficient structural strength to withstand all of the normal loading imposed thereon by the described driving devices. The coil spring also lends itself to a wide assortment of suitable driving mechanisms, the most suitable of which is a matter of design preferences.

In selecting the construction of the coil spring distributor, it should be made sufficiently resilient to pass over the cornering devices without imposing too great a strain on the cornering device. Also, the spring must not be so stiff as to bend away from the groove in the power wheel 96 (FIG. 8) where a power wheel type of drive is selected, the reason being that enough of the teeth 98 on the periphery of the wheel must be in engagement with the coil spring distributor 35 to impart longitudinal propelling force thereto. It will also be noted that with all of the different forms of driving devices described, the two ends of the spring 35 are readily connected by means of the pin 36, and since this pin lies within the coils of the spring, it does not interfere with proper driving engagement between the coils and the teeth or other driving members of the driving devices.

While only two feeder course arrangements have been selected as examples of the invention, it should be apparent that numerous other feeder course arrangements are equally acceptable. Also, the selected number of driving mechanisms for the coil spring distributor are intended as illustrations of the invention and are in no way intended to be restrictive thereof.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. A feeder system for poultry comprising a feed hopper for receiving and dispensing feed, a plurality of interconnected closed conduits and open feed troughs constructed to provide a feeder course in the form of a closed loop meeting at the ends thereof in said feed hopper, a flexible coiled feed distributor constructed of a length of coiled spring having spacings between adjacent coils thereof for receiving and transporting feed, said feed distributor being threaded through said feeder course and connected at the ends thereof to provide an endlessly movable closed loop, driving means for advancing said distributor through said course to receive feed from said hopper between the spaced coils which is thereafter advanced through said closed conduits to be discharged into said open troughs, said means for driving said flexible distributor having a plurality of rotatable opposed driver elements engageable with the coils of said distributor spring to impart translational movement thereto.

2. In a feed distributor system, a feed hopper, a plurality of operatively interconnected open feeder troughs and closed conduits, said feeder troughs and conduits being connected together and with said feed hopper to form a closed feeder course, a feed distributor constructed of a length of flexible coiled spring received through said feeder course, the coils of said feed distributor being spaced apart to provide feed for conveying therein, and means joining the free ends of said coil spring distributor to form an endless loop comprising a pin receivable wholly within the coils of each of said free ends and having a projecting lug at each end thereof adapted to be screwed into the free ends respectively of said coils to secure said ends together in the form of a continuous loop.

3. In a feed distributor system, a feed hopper, means for dispensing feed from said hopper, a plurality of conduits and feeder troughs which are operatively interconnected to form a feeder course, the ends of said feeder course being connected to said feed hopper to form a closed circuit, a flexible coiled spring feed distributor extending through said feeder course and connected at the ends thereof to provide a closed loop, said coiled spring being movable longitudinally through said feeder course, said feed distributor having spacing between the coils thereof which receive dispensed feed to be advanced through said feeder course for distribution from said feed hopper to said feeder troughs, drive means combined with said feed distributor and including pairs of spaced wheels adjacent the path of movement of said feed distributor, said support members having dowels extending therebetween spaced about the peripheries thereof, said dowels having driving engagement with the spaced coils of said distributor, said dowels being spaced relatively to each other according to the displacement between successive spring coils, and said pairs of wheels being located on opposite sides of said distributor and offset along the length of said distributor such that at least one of said dowels remains in driving engagement with a coil of said distributor at all times.

4. A feed conveyor system including interconnected feeder circuit and hopper elements forming a closed feeder course, comprising a feed distributing flexible coil spring threaded through said course for distributing feed therethrough from said hopper, connector means lying substantially within said coil spring and having a pair of spaced radially projecting pins engageable with adjacent coils for connecting the free ends of said spring to form an endless loop, and driving means having a plurality of spaced elements proportioned to engage the coils of said spring without interference with said connecting means.

5. In a feed distributor system, a hopper, a plurality of operatively interconnected open feeder troughs and conduits connected with said hopper to form a closed feeder course, a continuous flexible coil spring threaded through said feeder course and forming a feed conveyor for longitudinal movement therein, aisle crossing means in said feeder course comprising a pair of interfitting circular members forming a chamber, a pulley rotatably mounted in said chamber, each of said members including a conveyor conduit forming a portion of said feeder course leading tangentially to said pulley and receiving said conveyor therethrough, and means for effecting relative rotation of said circular members to provide for angular adjustment of said conduits one to the other.

6. In a poultry feeding system, a plurality of operatively interconnected feeder troughs and conduits forming a closed feeder course, a flexible feed conveyor threaded through said course for longitudinal movement therein, aisle crossing means in said feeder course comprising a pair of interfitting circular members forming a chamber, a pulley rotatably mounted in said chamber, each of said members including a conveyor conduit forming a portion of said feeder course leading tangentially to said pulley for receiving said conveyor therethrough, and means providing for the relative rotation of said circular members one to the other providing for angular adjustment of said conveyor conduit portions.

References Cited in the file of this patent

UNITED STATES PATENTS

| | | |
|---|---|---|
| 2,232,606 | Hudson | Feb. 18, 1941 |
| 2,575,551 | Frechin | Nov. 20, 1951 |
| 2,738,765 | Hart | Mar. 20, 1956 |
| 2,796,975 | Da Costa | June 25, 1957 |
| 2,878,922 | Bessette | Mar. 24, 1959 |

UNITED STATES PATENT OFFICE
CERTIFICATION OF CORRECTION

Patent 3,003,464                      October 10, 1961

Ralph K. Bailey

It is hereby certified that error appears in the above numbered patent requiring correction and that the said Letters Patent should read as corrected below.

Column 4, line 36, for "same" read -- some --; column 5, line 2, for "45" read -- 85 --; line 21, for "wtih" read -- with --; column 6, line 42, after "28" insert a comma; column 8, line 31, for "spacing" read -- spacings --; line 36, before "wheels" insert -- drive --; line 37, for "support members" read -- wheels --.

Signed and sealed this 3rd day of April 1962.

(SEAL)
Attest:

ERNEST W. SWIDER                          DAVID L. LADD Attesting Officer                             Commissioner of Patents